Nov. 4, 1924.
Re. 15,940
E. SHEER
AUTO LUGGAGE CARRIER
Original Filed July 26 1921 3 Sheets-Sheet 1
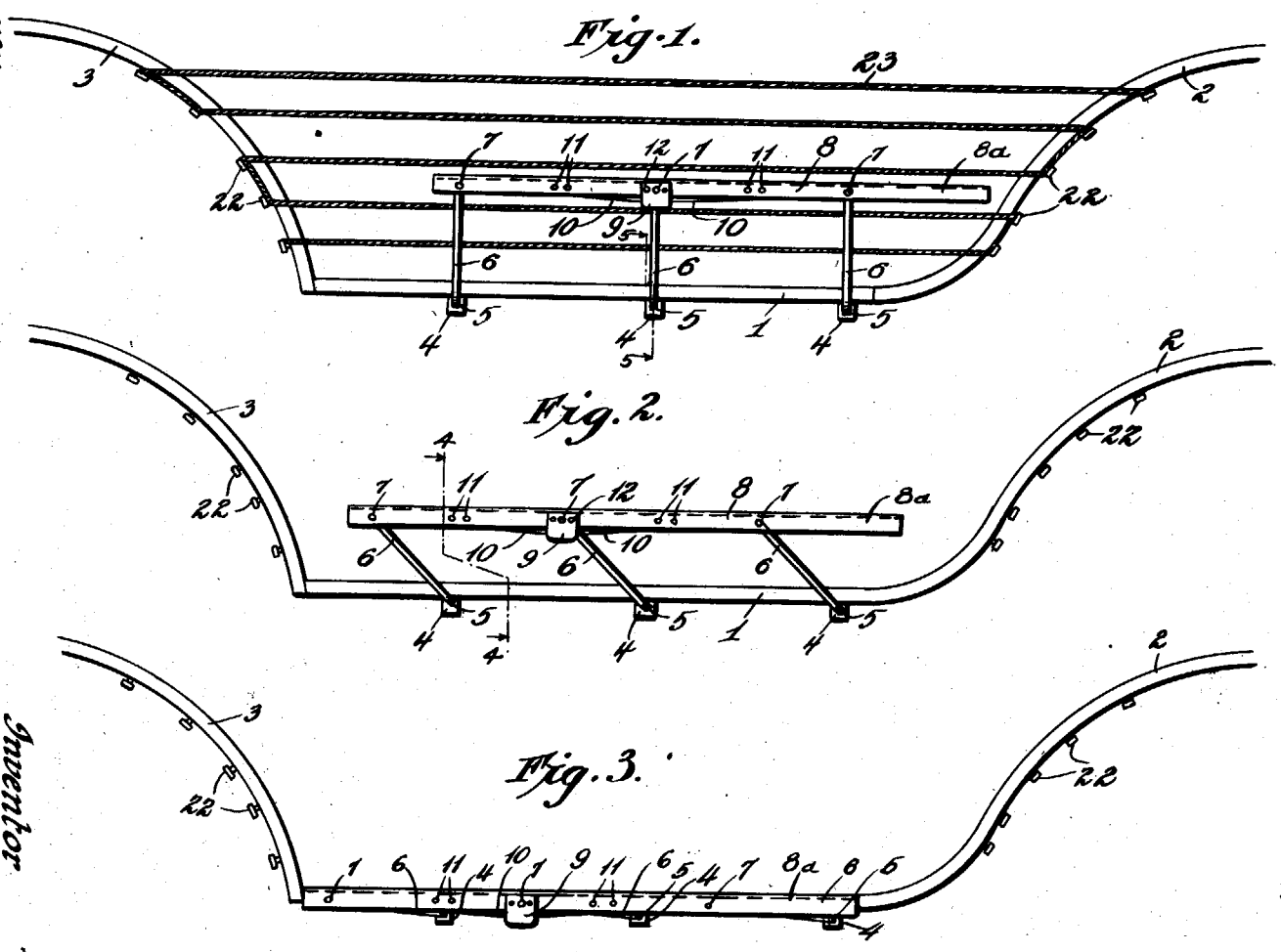
Witness
Inventor
Eugene Sheer
by Bair & Freeman Attys.

Nov. 4, 1924.
E. SHEER
Re. 15,940
AUTO LUGGAGE CARRIER
Original Filed July 26 1921 3 Sheets-Sheet 2
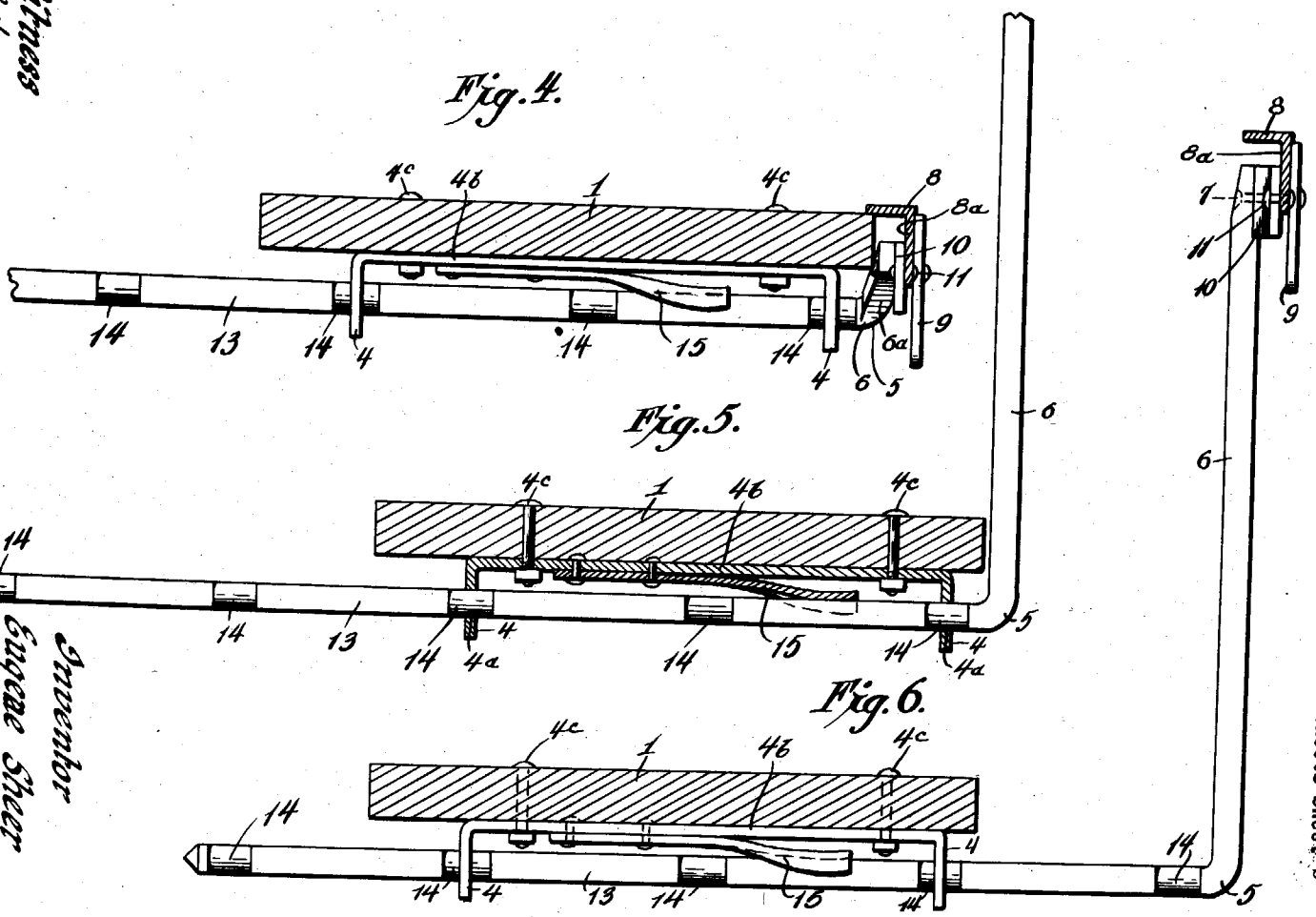
Witness
Ralph Kushey
Inventor
Eugene Sheer
by Blair & Freeman Attys.

Nov. 4, 1924.
E. SHEER
Re. 15,940
AUTO LUGGAGE CARRIER
Original Filed July 26 1921 3 Sheets-Sheet 3
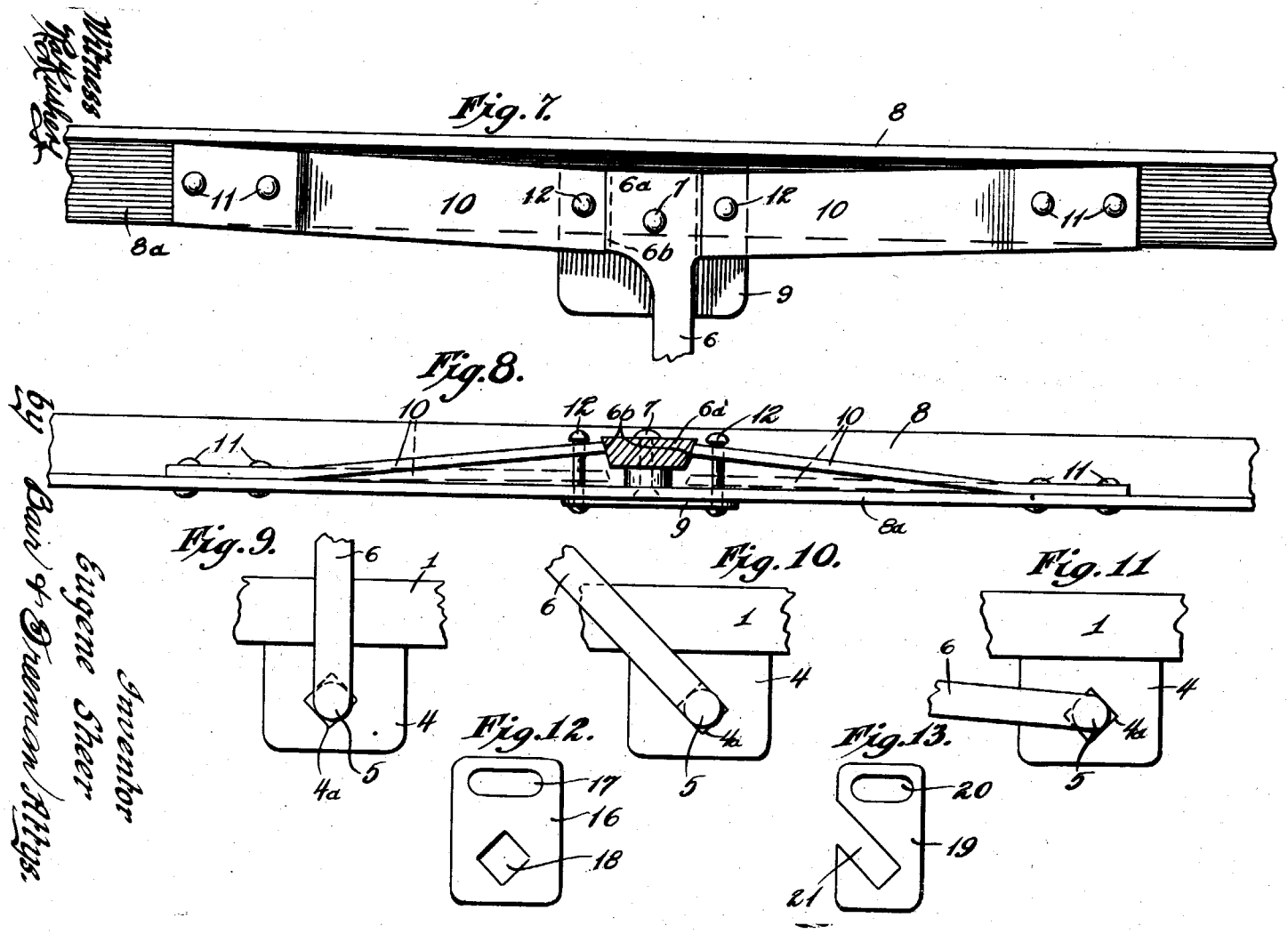
Witness
R. A. Kusher
Inventor
Eugene Sheer
by Bair & Freeman Attys.

Reissued Nov. 4, 1924. Re. 15,940

UNITED STATES PATENT OFFICE.

EUGENE SHEER, OF LINCOLN, ILLINOIS, ASSIGNOR TO MARQUETTE MANUFACTURING COMPANY, OF ST. PAUL, MINNESOTA.

AUTO LUGGAGE CARRIER.

Original No. 1,429,112, dated September 12, 1922, Serial No. 487,676, filed July 26, 1921. Application for reissue filed May 19, 1924. Serial No. 714,287.

*To all whom it may concern:*

Be it known that I, EUGENE SHEER, a citizen of the United States, residing at Lincoln, in the county of Logan and State of Illinois, have invented new and useful Improvements in Auto Luggage Carriers, of which the following is a specification.

My present invention pertains to luggage carriers for use in connection with motor vehicles and the like, and it contemplates the provision of a device that may be readily and easily extended above the running board of a motor vehicle, and as readily and easily returned to its initial position where it will be practically invisible.

The invention further contemplates the provision of a luggage carrier that may be made large or small in the discretion of the user when occasion requires the carrying of a large or small article.

The invention further contemplates the provision of a device for the purposes set forth, that is simple in construction and one that will add, rather than detract from the finished appearance of an automobile or the like.

Similar numerals of reference designate corresponding parts in all of the views of the drawings.

Figure 1 is a side elevation showing my novel device attached to the underside of a running board and in its operative position.

Figure 2 is a similar view illustrating the carrier partly extended ready to draw out to make the carrier larger.

Figure 3 is a similar view showing the device in its folded position.

Figure 4 is a transverse, sectional view taken on the line 4—4 of Figure 2, showing the carrier in closed position.

Figure 5 is a similar view taken on the line 5—5 of Figure 1 showing the device in extended position.

Figure 6 is a view similar to that of Figure 4 showing the device in extended position, and drawn out one notch to enlarge its carrying capacity.

Figure 7 is a view from back showing the arrangement of the upper locking springs with the carrier in operative position.

Figure 8 is an inverted plan view of the spring locking structure, the arm being shown in section.

Figure 9 is a detailed, fragmental view of the rod and the bearing therefore, when in operation.

Figure 10 is a similar view showing the device partially extended to enlarge.

Figure 11 is a similar view showing the device collapsed.

Figures 12 and 13 are detailed views of the various forms of hooks I may use in connection with the carrier for holding the rope I employ in connection with the invention.

My novel carrier is secured to the underside of the running board of a motor vehicle or the like, but should it happen that said running board was of such construction that it would not permit of safe carrying of a large and heavy article thereon, brace rods may be secured to the underside of the vehicle to receive the carrier.

The said carrier comprises the bearings $4^b$ that are secured at various lengths or distances throughout the running board 1 and are provided with the integral hangers 4 that are provided with the square opening or same as general shape of L rod 13, for bearing portions $4^a$ as shown.

This bearing as before set forth is duplicated at approximately equi-distant points throughout the length of the running board and is secured thereto by means of rivets or bolts $4^c$.

Adapted to be turned in the bearings $4^a$ are rods of L shape and indicated by 13. The rods 13 are provided with the round bearing surfaces 14 and the rounded surfaces 5 and the upstanding arm or portions 6. I would have it distinctly understood that the rods 13 are preferably square in cross section throughout, (but can be any other shape), except at the points where the rods have the rounded portions 14 adapted to turn in the square openings of the bearings $4^a$ and at the flat edge portions $6^a$.

An angle bar 8 is pivoted to the ends of the portions 6 of the rods 13.

It will be manifest that the rods 13 having rounded portions 14 are adapted to turn in the bearings $4^a$, when these portions 14 are in the bearings, but I would distinctly have it understood that the rods 13 are not adapted to turn or be casually displaced from the bearings when the rods are in vertical or horizontal positions with respect to the running board 1, and the square portions of the rods are in the bearings $4^a$.

The angle bar 8 is preferably of steel and is fastened to the upper ends of the portions 6 by means of rivets or bolts 7 in such manner that it may be dropped to the running board 1 or raised and lowered after the manner of a crank motion.

The ends of one or more of the upstanding arms or portions 6 of the rods 13 are provided with enlarged portions $6^a$, having beveled side edges $6^b$ and a flat upper edge or face, as illustrated in Figures 7 and 8. On the bolt 7, interposed between the enlarged portion $6^a$ and the flange $8^a$ of the angle bar 8 to which the upstanding arm 6 is secured is a washer $6^c$ of smaller diameter than the narrowest width of the enlarged portion $6^a$.

A flat spring or springs 10 are secured to the flange $8^a$ of the angle bar 8 by rivets 11, spaced from the end $6^a$. These springs extend to position adjacent to the enlarged portion $6^a$, as shown for instance in Figure 8, and are adapted to be moved to position for engaging the beveled faces $6^b$ for thus preventing pivotal movement of the angle bar 8 with relation to the portion 6.

Bolts 12 are extended loosely through the springs 10 near the enlarged portion $6^a$ and through the flange $8^a$ and are fastened to a fingerpiece 9 as shown.

By pushing the fingerpiece 9 away from the flange $8^a$, the springs 10 may be moved from their full line position shown in Figure 8 to their dotted line position, where they will lie in the plane of the washer $6^c$, whereupon the portions 14 of the rods 13 may be rotated in the square openings $4^b$, for collapsing the carrier.

The portions 6 are thus allowed pivotal movement with relation to the angle bar 8 for collapsing or extending the luggage carrier.

When the portions 6 are swung to upright position, the fingerpiece 9 may be engaged for forcing the movable ends of the springs 10 to their full line positions shown in Figure 8 for locking the luggage carrier in expanded position. When the carrier is collapsed, one spring may be moved to engage the end of the portion $6^a$ for locking the device in position.

When desired, in order to prevent rattling of the rods 13 against the bearings $4^b$, spring clips 15, having channel portions $15^a$ overlying and receiving the rods 13 may be employed. However, this is merely a matter of discretion.

In the practical use of the invention, the handle or fingerpiece 9 is compressed to release the springs 10, and then the angle arm 8 is moved upwardly until the rods 6 stand in the position shown in Figure 1. When the springs 10 reach the position shown in Figure 8, they will retain the carrier in rigid upright position and prevent collapse thereof. The hooks 16 and 19 having slots 17 and 20 respectively and openings 18 and 21 are adapted to be arranged on the rods 13, when desired, and ropes 23 may be stretched from these hooks to prevent casual bouncing or displacement of articles from the carrier. If desired hooks 22 may be placed on the fenders of the vehicle and in such case the hooks 16 and 19 may be dispensed with.

It will be noted that when the square portions of the rods 13 are received in the holes of the bearings $4^a$, the rods can not turn in the bearings. Spring clips 15 will frictionally hold the rods from longitudinal movement in the bearings and eliminate rattling.

It will be gathered from the foregoing that when occasion demands the carrier may be ready for instant use and that the same comprises no delicate parts such as are liable to become inoperative after a short period of use.

In the future practice of the invention, such changes in the construction and arrangement of parts may be made, as fairly fall within the scope of the claims appended.

Having described my invention, what I claim and desire to secure by Letters-Patent, is:

1. In an article carrier, the combination of bearings having integral dropped portions and having apertures in said portions, a rod adapted to seat in the bearings and having spaced rounded portions, an upstanding portion, and a flat faced end formed on the upstanding portion, means for securing the bearings to the underside of a vehicle, an angle arm pivotally secured to said end of the upstanding portion, a spring interposed between the angle arm and the flat faced end of the upstanding portion, and a washer of smaller diameter than the width of said end interposed between the said end and the inner end of the fastening means, and means for unseating the spring from its normal postition.

2. In an article carrier, the combination of bearings, a rod arranged in the bearings, an upstanding portion formed on the rod and having a flat faced end, an angle arm secured to the said end of the upstanding portion, a spring interposed between the arm and upstanding portion, and a washer slightly smaller in diameter than the width of said flat faced end arranged adjacent to said end of the upstanding portion, and means for moving the spring from its normal position.

3. The combination with the running board of an automobile of a collapsible luggage carrier comprising an angle bar, rigid rods pivoted thereto and to the running board, the horizontal flange of the angle bar cooperating with the running board to serve as a stop.

4. The combination with the running board of an automobile of a collapsible luggage carrier comprising an angle bar, rigid rods pivoted thereto and to the running board, said angle bar coacting with the running board so that the running board serves as a stop for the horizontal flange of the angle bar by engagement therewith and the angle bar forms a protective facing along the outer edge of the running board, the rods being positioned between the vertical flange of the angle bar and the running board and covered by the horizontal flange of the angle bar when in closed position.

5. The combination with the running board of an automobile of a collapsible luggage carrier comprising an angle bar, rigid rods pivoted thereto and to the running board, said angle bar being shaped to cooperate with the running board for serving as a stop for the horizontal flange of the angle bar by engagement therewith, and so that the angle bar when folded covers said rods and forms a protective facing along the outer edge of the running board, substantially flush with the upper face of said board.

6. A collapsible luggage carrier adapted to be supported on the running board of an automobile, comprising a bar, a series of rods pivoted to said bar at spaced points thereon, means for pivotally and slidably supporting said rods on a running board, whereby the device may be used as a luggage carrier with the rods in substantially upright position, may be adjusted laterally when in such position, or may be folded to position with the bar at the side of the running board and with the rods between the bar and the running board, and adjustable means for locking said carrier in any of said adjusted positions.

7. In a luggage carrier of the class described, a plurality of rods, means for pivotally and slidably supporting said rods on a running board, right-angled extensions on said rods, a bar pivoted to said extensions, said rods having spaced rounded portions and being angular in cross section through other portions of their lengths, said means having angular holes to receive said rods, and means for holding said rods against longitudinal movement in said holes.

8. The combination with a running board of an automobile of a collapsible luggage carrier comprising an angle bar, rigid rods pivoted thereto, means for fastening the rods to the running board for permitting them to pivot relative thereto for allowing the angle bar to be moved with a longitudinal swinging movement, said angle bar being shaped so that when the luggage carrier is collapsed it forms a protective covering for the rods from above and from one side and a protective facing along the outer edge of the running board substantially flush with the upper face of said board, and cooperates with the running board for serving as a stop for the horizontal flange of the angle bar by engagement therewith.

9. The combination with a running board of an automobile of a collapsible luggage carrier comprising an angle bar, rigid rods pivoted thereto and means for fastening the rods to the running board for permitting them to pivot relative thereto, the horizontal flange of the angle bar cooperating with the running board to serve as a stop and the angle bar serving as a protective facing along the outer edge of the running board.

10. The combination with a running board of an automobile of a collapsible luggage carrier comprising an angle bar, rigid rods pivoted thereto and means for fastening the rods to the running board for permitting them to pivot relative thereto, the horizontal flange of the angle bar cooperating with the running board to serve as a stop and the angle bar serving as a protective facing horizontally and vertically along the outer edge of the running board.

11. The combination with a running board of an automobile of a collapsible luggage carrier comprising an angle bar, rigid rods pivoted thereto and means for fastening the rods to the running board for permitting them to pivot relative thereto, the angle bar cooperating with the running board for serving as a stop for the horizontal flange of the angle bar by engagement therewith and as a protective facing along the outer edge of the running board.

Lincoln, Illinois, May 9, 1924.

EUGENE SHEER.